United States Patent
Yang

(10) Patent No.: US 11,272,430 B2
(45) Date of Patent: Mar. 8, 2022

(54) METHOD AND APPARATUS FOR CONTROLLING RESTRICTED UE CAPABILITY, AND COMPUTER STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/642,663

(22) PCT Filed: Oct. 19, 2017

(86) PCT No.: PCT/CN2017/106859
§ 371 (c)(1),
(2) Date: Feb. 27, 2020

(87) PCT Pub. No.: WO2019/075691
PCT Pub. Date: Apr. 25, 2019

(65) Prior Publication Data
US 2020/0260363 A1    Aug. 13, 2020

(51) Int. Cl.
*H04M 3/00* (2006.01)
*H04W 48/10* (2009.01)
*H04W 72/04* (2009.01)

(52) U.S. Cl.
CPC ......... *H04W 48/10* (2013.01); *H04W 72/042* (2013.01)

(58) Field of Classification Search
CPC ..... H04W 24/02; H04W 8/245; H04W 88/02; H04W 76/50; H04M 1/72522; G06F 9/50; Y02D 10/00
See application file for complete search history.

(56) References Cited

U.S. PATENT DOCUMENTS

| 9,661,676 B2 | 5/2017 | Liu |
| 9,716,988 B2 | 7/2017 | Vos |

(Continued)

FOREIGN PATENT DOCUMENTS

| CN | 101267642 | 9/2008 |
| CN | 102118721 | 7/2011 |

(Continued)

OTHER PUBLICATIONS

Samsung, "Network control of UE capability suspension," 3GPP TSG-RAN WG2 meeting #99, R2-1709483, Aug. 2017, 5 pages.
(Continued)

*Primary Examiner* — Shantell L Heiber
(74) *Attorney, Agent, or Firm* — Hodgson Russ LLP

(57) ABSTRACT

Disclosed in the present invention are a method and apparatus for controlling a restricted UE capability, and a computer storage medium. The method comprises: a base station sends UE capability configuration information to a terminal, the UE capability configuration information being used for indicating whether the terminal can send, to the base station, a request message for using a restricted UE capability; and when the base station receives the request message for using a restricted UE capability, which is sent by the terminal, the base station sends, to the terminal, a reply message for confirming the use of the restricted UE capability.

21 Claims, 4 Drawing Sheets

--- the base station sends UE capability configuration information to a terminal, where the UE capability configuration information is used to indicate whether the terminal can send to the base station a request message requesting for using a restricted UE capability — 101 the base station sends to the terminal a response message confirming the use of the restricted UE capability when receiving the request message for using the restricted UE capability sent by the terminal — 102

(56) References Cited

U.S. PATENT DOCUMENTS

| | | | |
|---|---|---|---|
| 2012/0231760 A1* | 9/2012 | Zhu | H04W 76/50 455/404.1 |
| 2013/0235738 A1* | 9/2013 | Siomina | H04W 24/08 370/252 |
| 2014/0004857 A1* | 1/2014 | Rune | H04W 48/12 455/434 |
| 2016/0029275 A1 | 1/2016 | Guo et al. | |
| 2016/0044566 A1 | 2/2016 | Nammi et al. | |
| 2017/0238163 A1 | 8/2017 | Chen | |
| 2018/0249453 A1* | 8/2018 | Nagaraja | H04W 72/042 |
| 2018/0331736 A1* | 11/2018 | Lidian | H04B 7/0626 |
| 2019/0082418 A1* | 3/2019 | Zee | H04W 68/04 |

FOREIGN PATENT DOCUMENTS

| | | |
|---|---|---|
| CN | 102833788 | 12/2012 |
| CN | 103580781 | 2/2014 |
| CN | 103581226 | 2/2014 |
| CN | 105981444 | 9/2016 |
| CN | 106465388 | 2/2017 |
| CN | 107046728 | 8/2017 |
| CN | 110786050 | 2/2020 |
| JP | 2015536612 | 12/2015 |
| RU | 2344550 | 1/2009 |
| WO | 2016161510 | 10/2016 |

OTHER PUBLICATIONS

ZTE Corporation, "Consideration on the Temporary Capability Restriction," 3GPP TSG RAN WG2 Meeting #99, R2-1708153, Aug. 2017, 4 pages.

WIPO, ISR for PCT/CN2017/106859, dated Jun. 21, 2018.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300, Jul. 2017, v14.4.0, 329 pages.

FSIP, Office Action for RU Application No. 2020114359/07, dated Jan. 28, 2021.

Intel Corporation, "Temporary UE capability restriction," 3GPP TSG-RAN WG2 #99bis, R2-1710611 (Revision of R2-1708788), Oct. 2017, 3 pages.

LG Electronics Inc., "NR UE Capability Size Reduction," 3GPP TSG-RAN2 Meeting RAN2 #99-Bis, R2-1711420, Revision of R2-1709453, Oct. 2017, 3 pages.

Huawei et al., "UE temporary access capability restriction," 3GPP TSG-RAN WG2#99bis, R2-1710344, Revision of R2-1709444, Oct. 2017, 3 pages.

VIVO, "UE radio access capabilities change," 3GPP TSG-RAN WG2 Meeting #99bis, R2-1710945 (Resubmission of R2-1708415), Oct. 2017, 3 pages.

JPO, Office Action for JP Application No. 2020-517414, dated Aug. 20, 2021.

Huawei et al., "UE temporary access capability restriction," 3GPP TSG-RAN WG2#99, R2-1709444, Aug. 2017, 3 pages.

Intel Corporation, "Temporary UE capability restriction," 3GPP TSG-RAN WG2 #99, R2-1708788 (Revision of R2-1707023), Aug. 2017, 3 pages.

ISDEC, Office Action for CA Application No. 3078410, dated May 14, 2021.

IPI, Office Action for IN Application No. 202017010454, dated Jul. 16, 2021.

CNIPA, Notification to Grant Patent Right for Invention for CN Application No. 202010075612.2, dated May 8, 2021.

FSIP, Office Action for RU Application No. 2020114359/07, dated Jun. 4, 2021.

IPOS, Office Action for SG Application No. 11202003105V, dated Dec. 20, 2021.

* cited by examiner

METHOD AND APPARATUS FOR CONTROLLING RESTRICTED UE CAPABILITY, AND COMPUTER STORAGE MEDIUM

CROSS-REFERENCE TO RELATED APPLICATION

This application is a U.S. national phase application of International Application No. PCT/CN2017/106859, filed Oct. 19, 2017, the entire disclosure of which is incorporated herein by reference.

TECHNICAL FIELD

The present disclosure relates to the field of wireless communication technologies, and in particular, to a method and an apparatus for controlling a restricted User Equipment (UE) capability, and a computer storage medium.

BACKGROUND

In order to meet the pursuit of speed, delay, high-speed mobility, energy efficiency and the diversity and complexity of services in the future, the 3rd Generation Partnership Project (3GPP) International Standards Organization has begun to develop the $5^{th}$ Generation (5G) mobile communication technology.

The main application scenarios of 5G mobile communication technology are: enhanced mobile broadband (eMBB), Ultra Reliable Low Latency Communication (URLLC), and massive machine type communication (mMTC).

The 5G mobile communication technology is also called Next Generation Wireless Communication Technology (NR, New Radio). When NR was deployed at early stage, it is difficult to achieve complete NR coverage, so the typical network coverage is combination of Long Term Evolution (LTE) coverage and NR coverage. In addition, in order to protect the previous investment of mobile operator in LTE, a tight interworking mode between LTE and NR is proposed.

When the UE encounters interference from other bands, or has problems such as device overheating, battery overconsumption, etc., the UE may temporarily change its own UE capability and report it to the base station, requesting the base station to use the restricted UE capability information (i.e., capability information of the restricted UE) to alleviate problems encountered by the UE.

SUMMARY

An embodiment of the present disclosure provides a method and an apparatus for controlling a restricted UE capability, and a computer storage medium.

A method for controlling a restricted UE capability provided by an embodiment of the present disclosure includes:
sending, by a base station, UE capability configuration information to a terminal, wherein the UE capability configuration information is used to indicate whether the terminal can send to the base station a request message for using the restricted UE capability; and
sending, by the base station, a response message confirming the use of the restricted UE capability to the terminal when receiving the request message for using the restricted UE capability sent by the terminal.

In an embodiment of the present disclosure, the sending, by a base station, UE capability configuration information to a terminal includes:
sending, by the base station, a broadcast signaling to the terminal, wherein the broadcast signaling carries the UE capability configuration information.

In an embodiment of the present disclosure, the broadcast signaling carrying the UE capability configuration information includes:
setting an identifier in the broadcast signaling, wherein the identifier being a first preset value indicates that the terminal can send to the base station a request message for using the restricted UE capability; and the identifier being a second preset value indicates that the terminal cannot send to the base station a request message for using the restricted UE capability.

In an embodiment of the present disclosure, the setting an identifier in the broadcast signaling includes:
setting an identifier corresponding to each access level by respectively using N bits in the broadcast signaling, wherein the identifier being a first preset value represents that a terminal that matches the corresponding access level can send to the base station a request message for using the restricted UE capability; the identifier being a second preset value represents that a terminal that matches the corresponding access level cannot send to the base station a request message for using the restricted UE capability, and N is a positive integer.

In an embodiment of the present disclosure, the broadcast signaling further carries configuration area information, the configuration area information is used to indicate an applicable range of the UE capability configuration information, the applicable range of the UE capability configuration information includes at least one of: a cell, a base station or a Public Land Mobile Network (PLMN);
when the applicable range of the UE capability configuration information is the PLMN, the broadcast signaling further carries a PLMN list;
when the applicable range of the UE capability configuration information is the cell, the broadcast signaling further carries a cell list; and
when the applicable range of the UE capability configuration information is the base station, the broadcast signaling further carries a base station list.

In an embodiment of the present disclosure, the sending, by a base station, UE capability configuration information to a terminal includes:
sending, by the base station, a dedicated signaling to the terminal, wherein the dedicated signaling carries the UE capability configuration information.

In an embodiment of the present disclosure, the dedicated signaling includes at least: a radio resource control (RRC) signaling, or a medium access control control element (MAC CE) signaling, or a physical downlink control channel (PDCCH) signaling.

In an embodiment of the present disclosure, an identifier is set in the dedicated signaling, the identifier being a first preset value indicates that the terminal can send to the base station a request message for using the restricted UE capability; and the identifier being a second preset value indicates that the terminal cannot send to the base station a request message for using the restricted UE capability.

In an embodiment of the present disclosure, the dedicated signaling further carries configuration area information, the configuration area information is used to indicate an applicable range of the UE capability configuration information, the applicable range of the UE capability configuration information includes at least one of: a cell, a base station or a PLMN;

when the applicable range of the UE capability configuration information is the PLMN, the broadcast signaling further carries a PLMN list;

when the applicable range of the UE capability configuration information is the cell, the broadcast signaling further carries a cell list; and when the applicable range of the UE capability configuration information is the base station, the broadcast signaling further carries a base station list.

In an embodiment of the present disclosure, if the applicable range of the UE capability configuration information is the cell, after the terminal changes the cell, the UE capability configuration information corresponding to the terminal is deleted;

if the applicable range of the UE capability configuration information is the base station, after the terminal changes the base station, the UE capability configuration information corresponding to the terminal is deleted; and if the applicable range of the UE capability configuration information is the PLMN, when the terminal is located in a PLMN other than those in the PLMN list, the UE capability configuration information corresponding to the terminal is deleted.

An apparatus for controlling a restricted user equipment UE capability provided by an embodiment of the present disclosure includes:

a UE capability control unit configured to send UE capability configuration information to a terminal, wherein the UE capability configuration information is used to indicate whether the terminal can send to the base station a request message requesting for using a restricted UE capability; and a UE capability confirmation unit configured to send to the terminal a response message confirming the use of the restricted UE capability when receiving the request message for using the restricted UE capability sent by the terminal.

In an embodiment of the present disclosure, the UE capability control unit includes:

a first sending subunit configured to send a broadcast signaling to the terminal, wherein the broadcast signaling carries the UE capability configuration information.

In an embodiment of the present disclosure, the UE capability control unit further includes:

a first setting subunit configured to set an identifier in the broadcast signaling, wherein the identifier being a first preset value indicates that the terminal can send to the base station a request message for using the restricted UE capability; and the identifier being a second preset value indicates that the terminal cannot send to the base station a request message for using the restricted UE capability.

In an embodiment of the present disclosure, the first setting subunit is further configured to set an identifier corresponding to each access level by respectively using N bits in the broadcast signaling, the identifier being a first preset value represents that a terminal that matches the corresponding access level can send to the base station a request message for using the restricted UE capability; the identifier being a second preset value represents that a terminal that matches the corresponding access level cannot send to the base station a request message for using the restricted UE capability, and N is a positive integer.

In an embodiment of the present disclosure, the broadcast signaling further carries configuration area information, the configuration area information is used to indicate an applicable range of the UE capability configuration information, the applicable range of the UE capability configuration information includes at least one of: a cell, a base station or a PLMN;

when the applicable range of the UE capability configuration information is the PLMN, the broadcast signaling further carries a PLMN list;

when the applicable range of the UE capability configuration information is the cell, the broadcast signaling further carries a cell list; and when the applicable range of the UE capability configuration information is the base station, the broadcast signaling further carries a base station list.

In an embodiment of the present disclosure, the UE capability control unit includes:

a second sending subunit configured to send a dedicated signaling to the terminal, wherein the dedicated signaling carries the UE capability configuration information.

In an embodiment of the present disclosure, the dedicated signaling includes at least: RRC signaling, or MAC CE signaling, or PDCCH signaling.

In an embodiment of the present disclosure, the UE capability control unit further includes:

a second setting subunit configured to set an identifier in the dedicated signaling, wherein the identifier being a first preset value indicates that the terminal can send to the base station a request message for using the restricted UE capability; and the identifier being a second preset value indicates that the terminal cannot send to the base station a request message for using the restricted UE capability.

In an embodiment of the present disclosure, the dedicated signaling further carries configuration area information, the configuration area information is used to indicate an applicable range of the UE capability configuration information, the applicable range of the UE capability configuration information includes at least one of: a cell, a base station or a PLMN;

when the applicable range of the UE capability configuration information is the PLMN, the broadcast signaling further carries a PLMN list;

when the applicable range of the UE capability configuration information is the cell, the broadcast signaling further carries a cell list; and when the applicable range of the UE capability configuration information is the base station, the broadcast signaling further carries a base station list.

In an embodiment of the present disclosure, the apparatus further includes:

a deleting unit configured to, if the applicable range of the UE capability configuration information is the cell, after the terminal changes the cell, delete the UE capability configuration information corresponding to the terminal; if the applicable range of the UE capability configuration information is the base station, after the terminal changes the base station, delete the UE capability configuration information corresponding to the terminal; and if the applicable range of the UE capability configuration information is the PLMN, when the terminal is located in a PLMN other than those in the PLMN list, delete the UE capability configuration information corresponding to the terminal.

A computer storage medium provided by an embodiment of the present disclosure has stored thereon computer executable instructions that, when executed by a processor, implement steps of the method for controlling a restricted UE capability.

BRIEF DESCRIPTION OF THE DRAWINGS

The drawings described herein are intended to provide a further understanding of the present disclosure, and are intended to be a part of the present disclosure. The illustrative embodiments of the present disclosure and the description thereof are for explaining the present disclosure and do not constitute an undue limitation of the present disclosure. In the drawing.

DETAILED DESCRIPTION

In order to understand the features and technical contents of the embodiments of the present disclosure in more detail, implementation of embodiments of the present disclosure will be described in detail below with reference to the accompanying drawings. The accompanying drawings are for illustrative purposes only and are not intended to limit the embodiments of the present disclosure.

The technical solution of the embodiment of the present disclosure is mainly applied to a 5G mobile communication system. Of course, the technical solution of the embodiment of the present disclosure is not limited to the 5G mobile communication system, and can also be applied to other types of mobile communication systems. The following describes the main application scenarios in the 5G mobile communication system.

1) The eMBB scenario. The eMBB aims to obtain multimedia content, services and data for users, and its business demands are growing rapidly. Because eMBB may be deployed in different scenarios, such as indoors, urban areas, and rural areas, the difference in service capabilities and requirements is relatively large. Therefore, services must be analyzed in combination with specific deployment scenarios.

2) The URLLC scenario. Typical applications of URLLC include: industrial automation, power automation, telemedicine operations, traffic security, and so on.

3) The mMTC scenario. Typical characteristics of URLLC include: high connection density, small data volume, delay-insensitive service, low cost and long service life of the module, and so on.

Regarding the UE capability acquisition architecture in the NR, the UE sends to the base station a request message for using the restricted UE capability, and the base station sends to the UE a response message confirming the use of the restricted UE capability. Then the UE and the base station communicate based on the restricted UE capability. It should be noted that this temporary restricted UE capability is transparent to the 5G core network (5GC, 5G Core), that is, only static UE capability information is stored in the 5GC.

In a specific implementation, the UE manufacturer can change the UE capability of the UE. From the perspective of the operator, the change of the UE capability needs to be implemented under the control of the network side, because the UE autonomously modifying its own UE capability may result in device instability, unpredictable UE behavior, additional signaling load, and user complaints.

In order to achieve the objective of controlling the UE capability, the embodiment of the present disclosure provides a method for controlling the restricted UE capability, and specifically, the method for the base station to control the capability of the UE to use the restricted UE.

Figure 1:
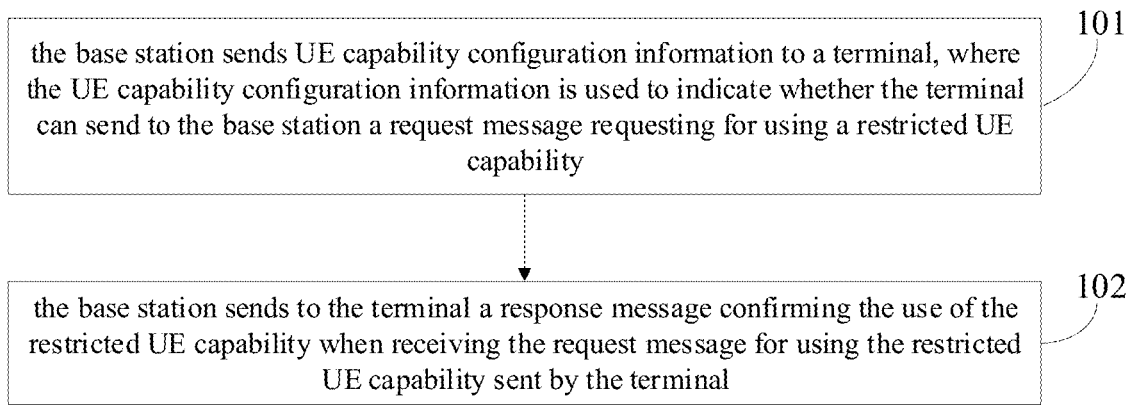
FIG. 1 is a first schematic flowchart of a method for controlling a restricted UE capability according to an embodiment of the present disclosure.

FIG. 1 is a first schematic flowchart of a method for controlling a restricted UE capability according to an embodiment of the present disclosure. As shown in FIG. 1, the method for controlling a UE capability includes the following steps.

At step 101, the base station sends UE capability configuration information to a terminal, wherein the UE capability configuration information is used to indicate whether the terminal can send to the base station a request message requesting for using a restricted UE capability.

In the embodiment of the present disclosure, the terminal may be any type of terminal, such as a mobile phone, a tablet computer, a notebook, an in-vehicle terminal, a smart home appliance, a terminal in an industrial field, and the like. The base station can be any type of base station, such as an eNB in LTE, a gNB in NR, and the like.

In the embodiment of the present disclosure, the base station sending UE capability configuration information to a terminal may be implemented as follows.

Implementation 1: the base station sends a broadcast signaling to the terminal, wherein the broadcast signaling carries the UE capability configuration information.

Implementation 2: the base station sends a dedicated signaling to the terminal, wherein the dedicated signaling carries the UE capability configuration information.

Here, the dedicated signaling includes at least: RRC signaling, or MAC CE signaling, or PDCCH signaling.

At step 102, the base station sends to the terminal a response message confirming the use of the restricted UE capability when receiving the request message for using the restricted UE capability sent by the terminal.

In the embodiment of the present disclosure, after receiving the UE capability configuration information sent by the base station, the terminal determines, according to the UE capability configuration information, whether the terminal can send to the base station a request message for using the restricted UE capability. If the terminal determines that the request message for using the restricted UE capability can be sent to the base station, the terminal sends to the base station a request message for using the restricted UE capability when the terminal encounters interference from other bands, or when the device is overheated or the battery is overconsumed. After receiving the request message for using the restricted UE capability sent by the terminal, the base station returns to the terminal a response message confirming the use of the restricted UE capability.

Figure 2:
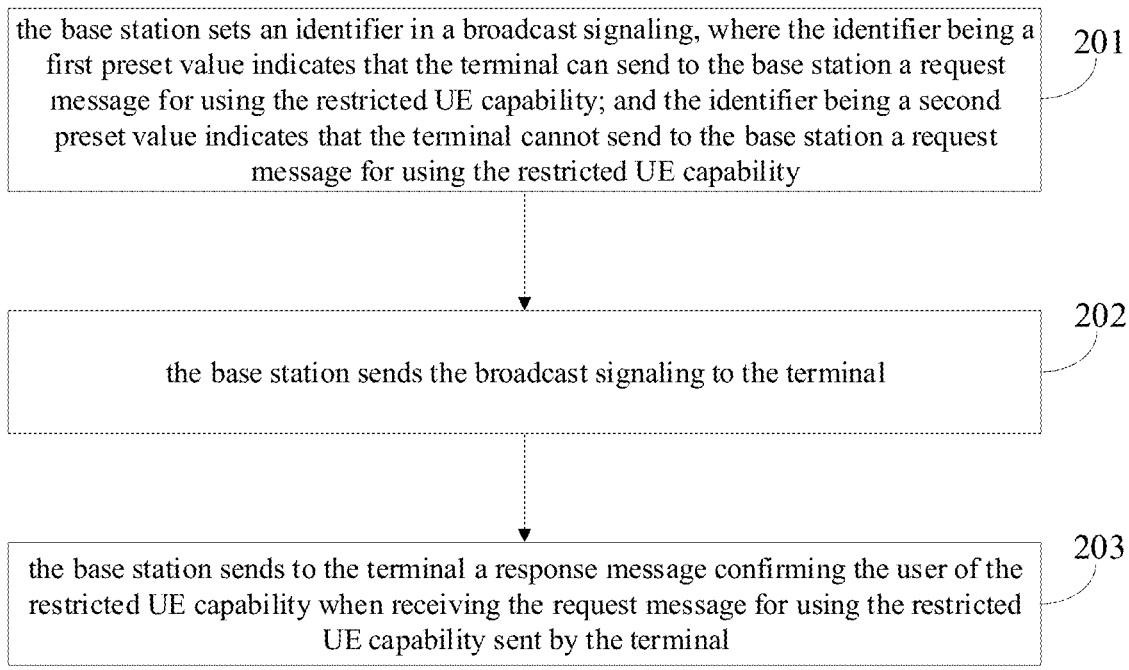
FIG. 2 is a second schematic flowchart of a method for controlling a restricted UE capability according to an embodiment of the present disclosure.

FIG. 2 is a second schematic flowchart of a method for controlling a restricted UE capability according to an embodiment of the present disclosure. As shown in FIG. 2, the method for controlling a restricted UE capability includes the following steps.

At step 201, the base station sets an identifier in a broadcast signaling, wherein the identifier being a first preset value indicates that the terminal can send to the base station a request message for using the restricted UE capability; and the identifier being a second preset value indicates that the terminal cannot send to the base station a request message for using the restricted UE capability.

In the embodiment of the present disclosure, the UE capability configuration information is implemented by an identifier in a broadcast signaling. In an implementation, a flag is set in the broadcast signaling to indicate whether the UE can send to the base station a request message for using the restricted UE capability.

For example, flag=1 indicates that the terminal can send to the base station a request message for using the restricted UE capability; flag=0 indicates that the terminal cannot send to the base station the request message for using the restricted UE capability.

To ensure the service experience of the high-end user, the base station sets an identifier in the broadcast signaling according to the access level information of the terminal or priority information of the user. In an implementation, an identifier corresponding to each access level (AC, Access Class) is set by respectively using N bits in the broadcast signaling, wherein the identifier being a first preset value represents that a terminal that matches the corresponding access level can send to the base station a request message for using the restricted UE capability; the identifier being a second preset value represents that a terminal that matches the corresponding access level cannot send to the base station a request message for using the restricted UE capability, and N is a positive integer.

Here, a flag is configured for the AC of each terminal. For multiple ACs, all corresponding flags form an AC bitmap. It is assumed that the AC bitmap includes N bits, and each bit corresponds to one AC. For example, the first bit corresponds to AC=0, the second bit corresponds to AC=1, so on so forth, and the Nth bit corresponds to AC=N−1. If the first bit is set to 0, the user with AC=0 cannot send to the base station a request message for using the restricted UE capability. If the second bit is set to 1, the user with AC=1 can send to the base station a request message for using the restricted UE capability.

Table 1 is a relationship between the AC bitmap and the restricted UE capabilities. As shown in Table 1, after receiving the broadcast signaling, the terminal searches for the flag corresponding to its own AC value in the AC bitmap from the broadcast signaling according to its own AC value, and determines whether a request message for using the restricted UE capability can be sent to the base station. For example, the AC value of the terminal is 3, and the corresponding flag is determined to be 1 based on the broadcast signaling. Therefore, the terminal can send to the base station a request message for using the restricted UE capability.

TABLE 1

| AC bitmap | 1 | 0 | 1 | 1 | 0 | 0 |
|---|---|---|---|---|---|---|
| AC Value | 0 | 1 | 2 | 3 | 4 | 5 |
| Whether the terminal corresponding to the AC value can send to the base station a request message for using the restricted UE capability | Can | Cannot | Can | Can | Cannot | Cannot |

In an implementation, the broadcast signaling further carries configuration area information, wherein the configuration area information is used to indicate an applicable range of the UE capability configuration information, and the applicable range of the UE capability configuration information includes at least one of: a cell, a base station or a network PLMN.

When the applicable range of the UE capability configuration information is PLMNs, the broadcast signaling further carries a PLMN list.

When the applicable range of the UE capability configuration information is cells, the broadcast signaling further carries a cell list.

When the applicable range of the UE capability configuration information is base stations, the broadcast signaling further carries a base station list.

In the embodiment of the present disclosure, if the applicable range of the UE capability configuration information is the cell, after the terminal changes the cell, the UE capability configuration information corresponding to the terminal is deleted.

If the applicable range of the UE capability configuration information is the base station, after the terminal changes the base station, the UE capability configuration information corresponding to the terminal is deleted.

If the applicable range of the UE capability configuration information is the PLMN, when the terminal is located in a PLMN other than those in the PLMN list, the UE capability configuration information corresponding to the terminal is deleted.

At step 202, the base station sends the broadcast signaling to the terminal.

Here, the broadcast signaling carries the UE capability configuration information set as in step 201.

At step 203, the base station sends to the terminal a response message confirming the user of the restricted UE capability when receiving the request message for using the restricted UE capability sent by the terminal.

In the embodiment of the present disclosure, after receiving the broadcast signaling sent by the base station, the terminal determines, according to the broadcast signaling, whether the terminal can send to the base station a request message for using the restricted UE capability. If the terminal determines that the request message for using the restricted UE capability can be sent to the base station, the terminal sends a request message for using the restricted UE capability to the base station when the terminal encounters interference from other bands, or when the device is overheated or the battery is over-consumed. After receiving the request message for using the restricted UE capability sent by the terminal, the base station returns to the terminal a response message confirming the use of the restricted UE capability.

Figure 3:
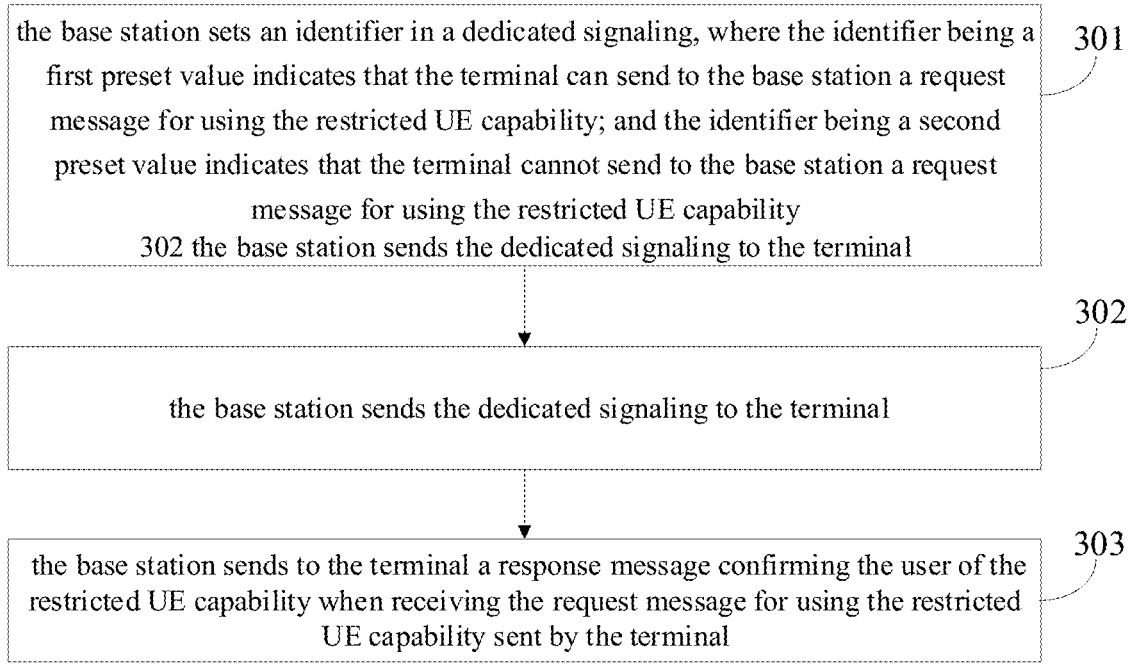
FIG. 3 is a third schematic flowchart of a method for controlling a restricted UE capability according to an embodiment of the present disclosure.

FIG. 3 is a third schematic flowchart of a method for controlling a restricted UE capability according to an embodiment of the present disclosure. As shown in FIG. 3, the method for controlling a UE capability includes the following steps.

At step 301, the base station sets an identifier in a dedicated signaling, wherein the identifier being a first preset value indicates that the terminal can send to the base station a request message for using the restricted UE capability; and the identifier being a second preset value indicates that the terminal cannot send to the base station a request message for using the restricted UE capability.

In the embodiment of the present disclosure, the UE capability configuration information is implemented by an identifier in a dedicated signaling. In an implementation, a flag is set in the dedicated signaling to indicate whether the UE can send to the base station a request message for using the restricted UE capability.

For example, flag=1 indicates that the terminal can send to the base station a request message for using the restricted UE capability; flag=0 indicates that the terminal cannot send to the base station the request message for using the restricted UE capability.

In the embodiment of the present disclosure, the dedicated signaling includes at least: an RRC signaling, or an MAC CE signaling, or a PDCCH signaling.

In an implementation, the dedicated signaling further carries configuration area information, wherein the configuration area information is used to indicate an applicable range of the UE capability configuration information, and the applicable range of the UE capability configuration information includes at least one of: a cell, a base station or a PLMN.

When the applicable range of the UE capability configuration information is PLMNs, the dedicated signaling further carries a PLMN list.

When the applicable range of the UE capability configuration information is cells, the dedicated signaling further carries a cell list.

When the applicable range of the UE capability configuration information is base stations, the dedicated signaling further carries a base station list.

In the embodiment of the present disclosure, if the applicable range of the UE capability configuration information is the cell, after the terminal changes the cell, the UE capability configuration information corresponding to the terminal is deleted.

If the applicable range of the UE capability configuration information is the base station, after the terminal changes the base station, the UE capability configuration information corresponding to the terminal is deleted.

If the applicable range of the UE capability configuration information is the PLMN, when the terminal is located in a PLMN other than those in the PLMN list, the UE capability configuration information corresponding to the terminal is deleted.

At step 302, the base station sends the dedicated signaling to the terminal.

Here, the dedicated signaling carries the UE capability configuration information set as in step 301.

At step 303, the base station sends to the terminal a response message confirming the user of the restricted UE capability when receiving the request message for using the restricted UE capability sent by the terminal.

In the embodiment of the present disclosure, after receiving the dedicated signaling sent by the base station, the terminal determines, according to the dedicated signaling, whether the terminal can send to the base station a request message for using the restricted UE capability. If the terminal determines that the request message for using the restricted UE capability can be sent to the base station, the terminal sends a request message for using the restricted UE capability to the base station when the terminal encounters interference from other bands, or when the device is overheated or the battery is over-consumed. After receiving the request message for using the restricted UE capability sent by the terminal, the base station returns to the terminal a response message confirming the use of the restricted UE capability.

Figure 4:
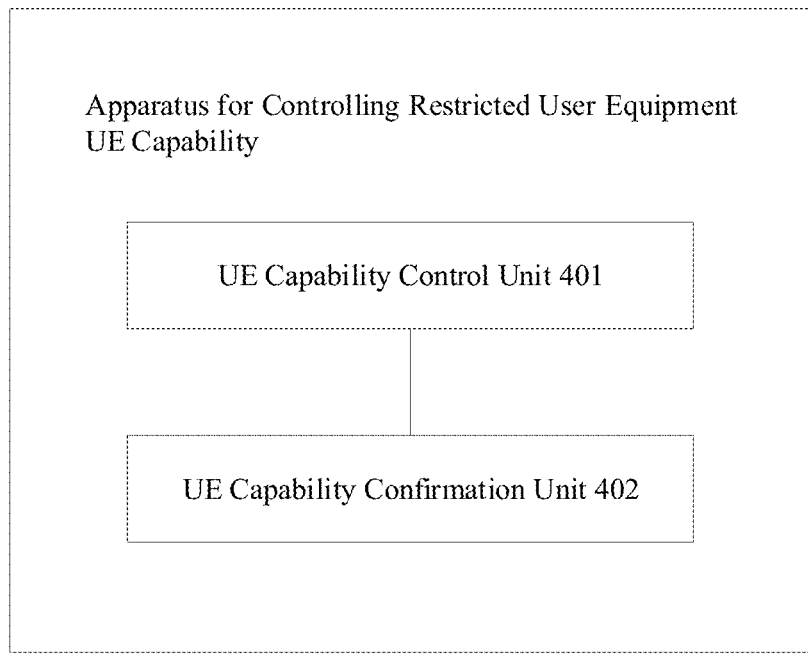
FIG. 4 is a first schematic block diagram of an apparatus for controlling a restricted user equipment UE capability according to an embodiment of the present disclosure.

FIG. 4 is a first schematic block diagram of an apparatus for controlling a restricted user equipment UE capability according to an embodiment of the present disclosure. As shown in FIG. 4, the apparatus for controlling a restricted user equipment UE capability includes:

a UE capability control unit 401 configured to send UE capability configuration information to a terminal, wherein the UE capability configuration information is used to indicate whether the terminal can send to the base station a request message requesting for using a restricted UE capability; and a UE capability confirmation unit 402 configured to send to the terminal a response message confirming the use of the restricted UE capability when receiving the request message for using the restricted UE capability sent by the terminal.

It should be understood by those skilled in the art that the function achieved by each unit in the apparatus for controlling a restricted user equipment UE capability shown in FIG. 4 can be understood by referring to the related description of the above method for controlling a restricted user equipment UE capability. The function of each unit in the apparatus for controlling a restricted user equipment UE capability shown in FIG. 4 can be achieved by a program running on a processor, or may be implemented by a specific logic circuit.

Figure 5:
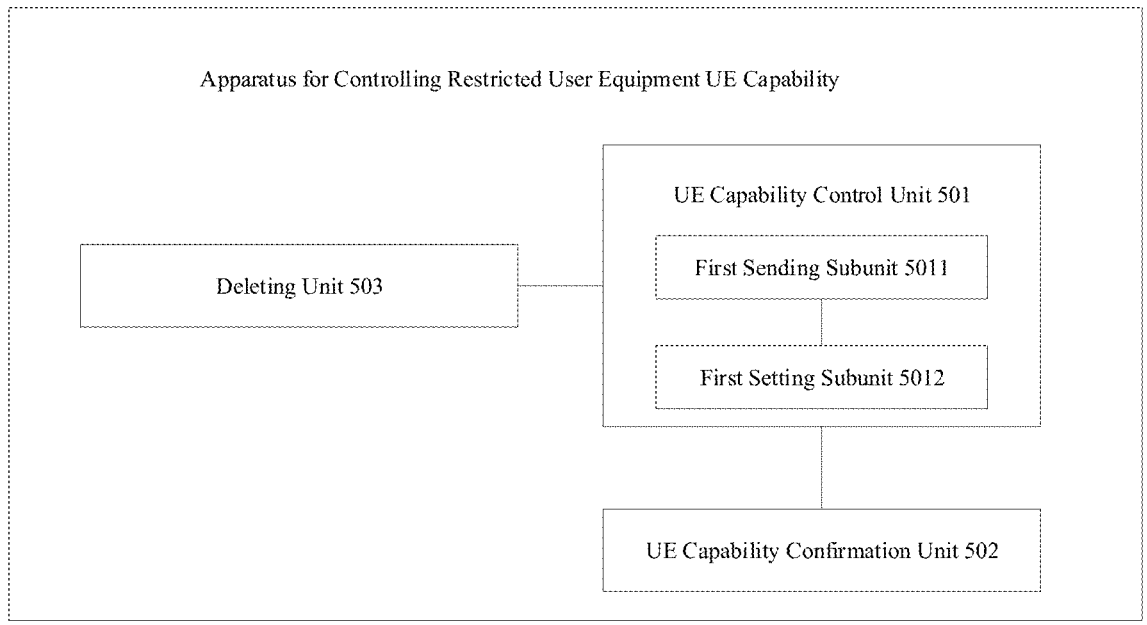
FIG. 5 is a second schematic block diagram of an apparatus for controlling a restricted user equipment UE capability according to an embodiment of the present disclosure.

FIG. 5 is a second schematic block diagram of an apparatus for controlling a restricted user equipment UE capability according to an embodiment of the present disclosure. As shown in FIG. 5, the apparatus for controlling a restricted user equipment UE capability includes:

a UE capability control unit 501 configured to send UE capability configuration information to a terminal, wherein the UE capability configuration information is used to indicate whether the terminal can send to the base station a request message requesting for using a restricted UE capability; and a UE capability confirmation unit 502 configured to send to the terminal a response message confirming the use of the restricted UE capability when receiving the request message for using the restricted UE capability sent by the terminal.

The UE capability control unit 501 includes:

a first sending subunit 5011 configured to send a broadcast signaling to the terminal, wherein the broadcast signaling carries the UE capability configuration information.

The UE capability control unit 501 further includes:

a first setting subunit 5012 configured to set an identifier in the broadcast signaling, wherein the identifier being a first preset value indicates that the terminal can send to the base station a request message for using the restricted UE capability; and the identifier being a second preset value indicates that the terminal cannot send to the base station a request message for using the restricted UE capability.

The first setting subunit 5012 is further configured to set an identifier corresponding to each access level by respectively using N bits in the broadcast signaling, wherein the identifier being a first preset value represents that a terminal that matches the corresponding access level can send to the base station a request message for using the restricted UE capability; the identifier being a second preset value represents that a terminal that matches the corresponding access level cannot send to the base station a request message for using the restricted UE capability, and N is a positive integer.

In an implementation, the broadcast signaling further carries configuration area information, wherein the configuration area information is used to indicate an applicable range of the UE capability configuration information, and the applicable range of the UE capability configuration information includes at least one of: a cell, a base station or a PLMN.

When the applicable range of the UE capability configuration information is PLMNs, the broadcast signaling further carries a PLMN list.

When the applicable range of the UE capability configuration information is cells, the broadcast signaling further carries a cell list.

When the applicable range of the UE capability configuration information is base stations, the broadcast signaling further carries a base station list.

In an implementation, the apparatus further includes:

a deleting unit 503 configured to, if the applicable range of the UE capability configuration information is the cell, after the terminal changes the cell, delete the UE capability configuration information corresponding to the terminal; if the applicable range of the UE capability configuration information is the base station, after the terminal changes the base station, delete the UE capability configuration information corresponding to the terminal; and if the applicable range of the UE capability configuration information is the PLMN, when the terminal is located in a PLMN other than those in the PLMN list, delete the UE capability configuration information corresponding to the terminal.

It should be understood by those skilled in the art that the function achieved by each unit in the apparatus for controlling a restricted user equipment UE capability shown in FIG. 5 can be understood by referring to the related description of the above method for controlling a restricted user equipment UE capability. The function of each unit in the apparatus for controlling a restricted user equipment UE capability shown in FIG. 5 can be achieved by a program running on a processor, or may be implemented by a specific logic circuit.

Figure 6:
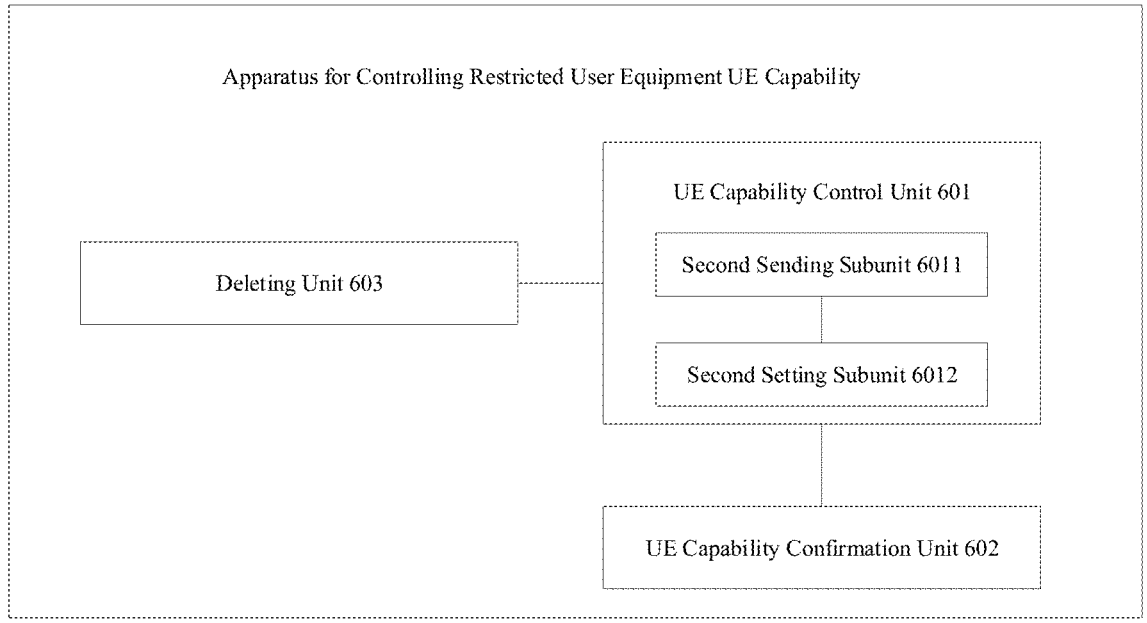
FIG. 6 is a third schematic block diagram of an apparatus for controlling a restricted user equipment UE capability according to an embodiment of the present disclosure.

FIG. 6 is a third schematic block diagram of an apparatus for controlling a restricted user equipment UE capability according to an embodiment of the present disclosure. As shown in FIG. 6, the apparatus for controlling a restricted user equipment UE capability includes:

a UE capability control unit 601 configured to send UE capability configuration information to a terminal, wherein the UE capability configuration information is used to indicate whether the terminal can send to the base station a request message requesting for using a restricted UE capability; and a UE capability confirmation unit 602 configured to send to the terminal a response message confirming the use of the restricted UE capability when receiving the request message for using the restricted UE capability sent by the terminal.

The UE capability control unit 601 includes:

a second sending subunit 6011 configured to send a dedicated signaling to the terminal, wherein the dedicated signaling carries the UE capability configuration information.

In an implementation, the dedicated signaling includes at least: RRC signaling, or MAC CE signaling, or PDCCH signaling.

The UE capability control unit 601 further includes:

a second setting subunit 6012 configured to set an identifier in the dedicated signaling, wherein the identifier being a first preset value indicates that the terminal can send to the base station a request message for using the restricted UE capability; and the identifier being a second preset value indicates that the terminal cannot send to the base station a request message for using the restricted UE capability.

In an implementation, the dedicated signaling further carries configuration area information, wherein the configuration area information is used to indicate an applicable range of the UE capability configuration information, and the applicable range of the UE capability configuration information includes at least one of: a cell, a base station or a PLMN.

When the applicable range of the UE capability configuration information is PLMNs, the dedicated signaling further carries a PLMN list.

When the applicable range of the UE capability configuration information is cells, the dedicated signaling further carries a cell list.

When the applicable range of the UE capability configuration information is base stations, the dedicated signaling further carries a base station list.

In an implementation, the apparatus further includes:

a deleting unit 603 configured to, if the applicable range of the UE capability configuration information is the cell, after the terminal changes the cell, delete the UE capability configuration information corresponding to the terminal; if the applicable range of the UE capability configuration information is the base station, after the terminal changes the base station, delete the UE capability configuration information corresponding to the terminal; and if the applicable range of the UE capability configuration information is the PLMN, when the terminal is located in a PLMN other than those in the PLMN list, delete the UE capability configuration information corresponding to the terminal.

It should be understood by those skilled in the art that the function achieved by each unit in the apparatus for controlling a restricted user equipment UE capability shown in FIG. 6 can be understood by referring to the related description of the above method for controlling a restricted user equipment UE capability. The function of each unit in the apparatus for controlling a restricted user equipment UE capability shown in FIG. 6 can be achieved by a program running on a processor, or may be implemented by a specific logic circuit.

In the embodiments of the present disclosure, if the apparatus for controlling a restricted user equipment UE capability is implemented in the form of modules of software function and sold or used as a standalone product, it may also be stored in a computer readable storage medium. Based on such understanding, the technical solution of the embodiments of the present disclosure may be embodied in the form of a software product in essence or in the form of a software product stored in a storage medium, including a plurality of instructions to cause a computer device (which may be a personal computer, a server, or a network device, etc.) to perform all or part of the methods described in various embodiments of the present disclosure. The above storage medium includes various media that can store program codes, such as a USB flash drive, a mobile hard disk, a read only memory (ROM), a magnetic disk, or an optical disk. Thus, embodiments of the present disclosure are not limited to any specific combination of hardware and software.

Correspondingly, an embodiment of the present disclosure further provides a computer storage medium storing a computer program, and the computer program is configured to execute the method for controlling a restricted user equipment UE capability according to the embodiment of the present disclosure.

Figure 7:
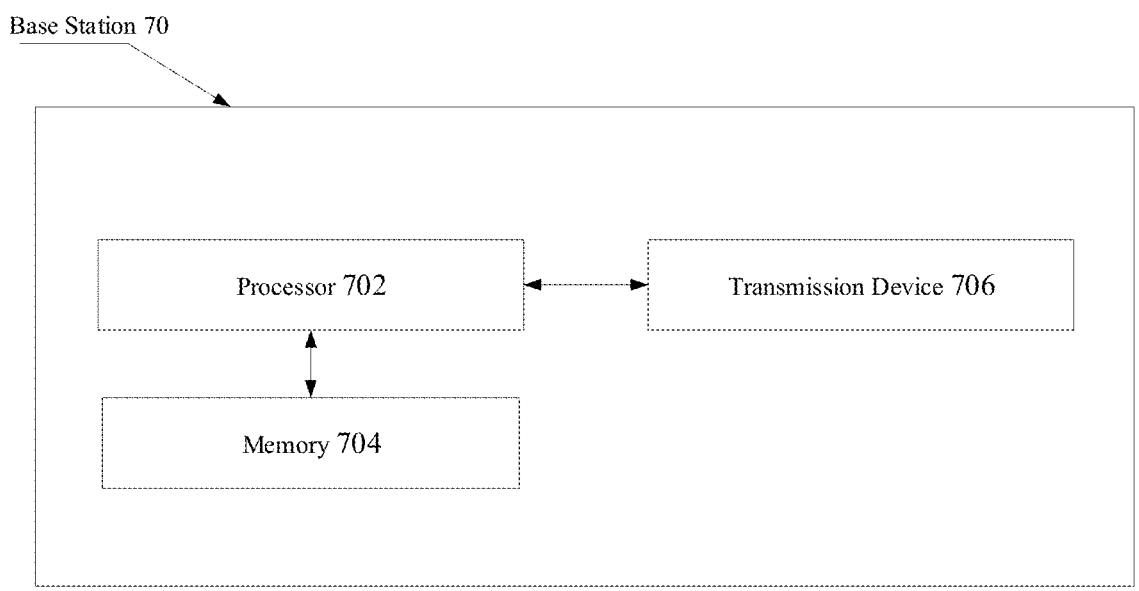
FIG. 7 is a schematic block diagram of a base station according to an embodiment of the present disclosure.

FIG. 7 is a schematic block diagram of a base station according to an embodiment of the present disclosure. As shown in FIG. 7, the base station 70 may include one or more (only one shown) processors 702 (the processor 702 may include but not limited to a processing device such as a Micro Controller Unit (MCU) or a Field Programmable Gate Array (FPGA)), a memory 704 for storing data, and a transmission device 706 for communication functions. It will be understood by those skilled in the art that the structure shown in FIG. 7 is merely illustrative and does not limit the structure of the above electronic device. For example, the base station 70 may also include more or fewer components than shown in FIG. 7, or have a different configuration than that shown in FIG. 7.

The memory 704 can be used to store software programs and modules of the application software, such as program instructions/modules corresponding to the method for controlling a restricted user equipment UE capability in the embodiment of the present disclosure, and the processor 702 runs the software program and modules stored in the memory 704, thus performing various functional applications and data processing, to implement the above method. The memory 704 can include a high-speed random access memory and can also include a non-volatile memory, such as one or more magnetic storage devices, flash memories, or other non-volatile solid state memories. In some examples, memory 704 can further include memory remotely located relative to processor 702, which can be connected to base station 70 over a network. Examples of such networks include, but not limited to, the Internet, intranets, local area networks, mobile communication networks, and combinations thereof.

The transmission device 706 is for receiving or transmitting data via a network. The specific examples of networks described above may include a wireless network provided by a communication provider of the base station 70. In one example, the transmission device 706 includes a network interface controller (NIC) that can be connected to other network devices through the base station to communicate with the Internet. In one example, the transmission device 706 can be a radio frequency (RF) module for communicating with the Internet wirelessly.

The technical solutions described in the embodiments of the present disclosure can be combined as desired without conflict.

In the technical solution of the present disclosure, the base station sends UE capability configuration information to a terminal, wherein the UE capability configuration information is used to indicate whether the terminal can send to the base station a request message requesting for using a restricted UE capability; and the base station sends to the terminal a response message confirming the use of the restricted UE capability when receiving the request message for using the restricted UE capability sent by the terminal. With the technical solution of the embodiment of the present invention, the base station notifies the terminal whether the terminal can initiate the request message for using the restricted UE capability through a broadcast signaling or a dedicated signaling, so it can achieve the objective of controlling the restricted UE capability for the operator.

In the several embodiments provided by the present disclosure, it should be understood that the disclosed method and smart device may be implemented in other manners. The apparatus embodiments described above are merely illustrative. For example, the division of the units is only a logical function division. In actual implementation, there may be another division manner, such as: multiple units or components may be combined, or may be integrated into another system, or some features can be ignored or not executed. In addition, the coupling, or direct coupling, or communication connection of the components shown or discussed may be indirect coupling or communication connection through some interfaces, devices or units, and may be electrical, mechanical or in other forms.

The units described above as separate components may or may not be physically separated, and the components displayed as the unit may or may not be physical units, that is, may be located in one place or distributed to multiple network units. Some or all of the units may be selected according to actual needs to achieve the objective of the solution of the embodiment.

In addition, each functional unit in each embodiment of the present disclosure may be integrated into one second processing unit, or each unit may be separately used as one unit, or two or more units may be integrated into one unit. The above integrated unit can be implemented in the form of hardware or in the form of hardware plus software functional units.

The above is only specific embodiments of the present disclosure, but the scope of the present disclosure is not limited thereto, and modifications or substitutions easily conceived by any person skilled in the art within the technical scope of the present disclosure should be covered by the scope of the present disclosure.

What is claimed is:

1. A method for controlling a restricted user equipment (UE) capability, the method comprising:
    sending, by a base station, UE capability configuration information to a terminal, wherein the UE capability configuration information is used to indicate whether the terminal can send to the base station a request message for changing its current UE capability and using the restricted UE capability when the terminal is overheated; and
    sending, by the base station, a response message confirming the use of the restricted UE capability to the terminal in response to receiving the request message for using the restricted UE capability sent by the terminal.

2. The method for controlling the restricted UE capability according to claim 1, wherein the sending, by the base station, UE capability configuration information to the terminal comprises:
    sending, by the base station, a broadcast signaling to the terminal, wherein the broadcast signaling carries the UE capability configuration information.

3. The method for controlling the restricted UE capability according to claim 2, wherein the broadcast signaling carrying the UE capability configuration information comprises:
    setting an identifier in the broadcast signaling, wherein the identifier being a first preset value indicates that the terminal can send to the base station the request message for using the restricted UE capability; and the identifier being a second preset value indicates that the terminal cannot send to the base station the request message for using the restricted UE capability.

4. The method for controlling the restricted UE capability according to claim 3, wherein the setting the identifier in the broadcast signaling comprises:
    setting the identifier corresponding to each access level by respectively using N bits in the broadcast signaling, wherein the identifier being the first preset value represents that the terminal that matches the corresponding access level can send to the base station the request message for using the restricted UE capability; the identifier being the second preset value represents that the terminal that matches the corresponding access level cannot send to the base station the request message for using the restricted UE capability, and N is a positive integer.

5. The method for controlling the restricted UE capability according to claim 2, wherein the broadcast signaling further carries configuration area information, the configuration area information is used to indicate an applicable range of the UE capability configuration information, the applicable range of the UE capability configuration information comprises at least one of: a cell, a base station or a Public Land Mobile Network (PLMN);
   when the applicable range of the UE capability configuration information is the PLMN, the broadcast signaling further carries a PLMN list;
   when the applicable range of the UE capability configuration information is the cell, the broadcast signaling further carries a cell list; and
   when the applicable range of the UE capability configuration information is the base station, the broadcast signaling further carries a base station list.

6. The method for controlling the restricted UE capability according to claim 5, wherein
   if the applicable range of the UE capability configuration information is the cell, after the terminal changes the cell, the UE capability configuration information corresponding to the terminal is deleted;
   if the applicable range of the UE capability configuration information is the base station, after the terminal changes the base station, the UE capability configuration information corresponding to the terminal is deleted; and
   if the applicable range of the UE capability configuration information is the PLMN, when the terminal is located in a PLMN other than those in the PLMN list, the UE capability configuration information corresponding to the terminal is deleted.

7. The method for controlling the restricted UE capability according to claim 1, wherein the sending, by the base station, UE capability configuration information to the terminal comprises:
   sending, by the base station, a dedicated signaling to the terminal, wherein the dedicated signaling carries the UE capability configuration information.

8. The method for controlling the restricted UE capability according to claim 7, wherein the dedicated signaling comprises at least: a radio resource control (RRC) signaling, or a medium access control control element (MAC CE) signaling, or a physical downlink control channel (PDCCH) signaling.

9. The method for controlling the restricted UE capability according to claim 7, wherein an identifier is set in the dedicated signaling, the identifier being a first preset value indicates that the terminal can send to the base station the request message for using the restricted UE capability; and the identifier being a second preset value indicates that the terminal cannot send to the base station the request message for using the restricted UE capability.

10. The method for controlling the restricted UE capability according to claim 7, wherein the dedicated signaling further carries configuration area information, the configuration area information is used to indicate an applicable range of the UE capability configuration information, the applicable range of the UE capability configuration information comprises at least one of: a cell, a base station or a PLMN;
   when the applicable range of the UE capability configuration information is the PLMN, a broadcast signaling further carries a PLMN list;
   when the applicable range of the UE capability configuration information is the cell, the broadcast signaling further carries a cell list; and
   when the applicable range of the UE capability configuration information is the base station, the broadcast signaling further carries a base station list.

11. A computer storage medium having stored thereon computer executable instructions that, when executed by a processor, implement steps of the method according to claim 1.

12. An apparatus for controlling a restricted user equipment (UE) capability, the apparatus comprising a processor, a transmission device, and a memory storing computer executable instructions that, when executed by the processor, causes the apparatus for controlling the restricted user equipment UE capability to:
   send UE capability configuration information to a terminal, wherein the UE capability configuration information is used to indicate whether the terminal can send to a base station a request message requesting for changing its current UE capability and using the restricted UE capability when the terminal is overheated; and
   send to the terminal a response message confirming the use of the restricted UE capability in response to receiving the request message for using the restricted UE capability sent by the terminal.

13. The apparatus for controlling the restricted user equipment UE capability according to claim 12, wherein the apparatus for controlling the restricted user equipment UE capability is further caused to:
   send a broadcast signaling to the terminal, wherein the broadcast signaling carries the UE capability configuration information.

14. The apparatus for controlling the restricted user equipment UE capability according to claim 13, wherein the apparatus for controlling the restricted user equipment UE capability is further caused to:
   set an identifier in the broadcast signaling, wherein the identifier being a first preset value indicates that the terminal can send to the base station the request message for using the restricted UE capability; and the identifier being a second preset value indicates that the terminal cannot send to the base station the request message for using the restricted UE capability.

15. The apparatus for controlling the restricted user equipment UE capability according to claim 14, wherein the apparatus for controlling the restricted user equipment UE capability is further caused to set the identifier corresponding to each access level by respectively using N bits in the broadcast signaling, the identifier being the first preset value represents that the terminal that matches the corresponding access level can send to the base station the request message for using the restricted UE capability; the identifier being the second preset value represents that the terminal that matches the corresponding access level cannot send to the base station the request message for using the restricted UE capability, and N is a positive integer.

16. The apparatus for controlling the restricted user equipment UE capability according to claim 13, wherein the broadcast signaling further carries configuration area information, the configuration area information is used to indicate an applicable range of the UE capability configuration information, the applicable range of the UE capability configuration information comprises at least one of: a cell, a base station or a PLMN;

when the applicable range of the UE capability configuration information is the PLMN, the broadcast signaling further carries a PLMN list;

when the applicable range of the UE capability configuration information is the cell, the broadcast signaling further carries a cell list; and when the applicable range of the UE capability configuration information is the base station, the broadcast signaling further carries a base station list.

17. The apparatus for controlling the restricted user equipment UE capability according to claim 16, the apparatus for controlling the restricted user equipment UE capability is further caused to:

if the applicable range of the UE capability configuration information is the cell, after the terminal changes the cell, delete the UE capability configuration information corresponding to the terminal; if the applicable range of the UE capability configuration information is the base station, after the terminal changes the base station, delete the UE capability configuration information corresponding to the terminal; and if the applicable range of the UE capability configuration information is the PLMN, when the terminal is located in a PLMN other than those in the PLMN list, delete the UE capability configuration information corresponding to the terminal.

18. The apparatus for controlling the restricted user equipment UE capability according to claim 12, wherein the apparatus for controlling the restricted user equipment UE capability is further caused to:

send a dedicated signaling to the terminal, wherein the dedicated signaling carries the UE capability configuration information.

19. The apparatus for controlling the restricted user equipment UE capability according to claim 18, wherein the dedicated signaling comprises at least: a RRC signaling, or an MAC CE signaling, or a PDCCH signaling.

20. The apparatus for controlling the restricted user equipment UE capability according to claim 18, wherein the apparatus for controlling the restricted user equipment UE capability is further caused to:

set an identifier in the dedicated signaling, wherein the identifier being a first preset value indicates that the terminal can send to the base station the request message for using the restricted UE capability; and the identifier being a second preset value indicates that the terminal cannot send to the base station the request message for using the restricted UE capability.

21. The apparatus for controlling the restricted user equipment UE capability according to claim 18, wherein the dedicated signaling further carries configuration area information, the configuration area information is used to indicate an applicable range of the UE capability configuration information, the applicable range of the UE capability configuration information comprises at least one of: a cell, a base station or a PLMN;

when the applicable range of the UE capability configuration information is the PLMN, a broadcast signaling further carries a PLMN list;

when the applicable range of the UE capability configuration information is the cell, the broadcast signaling further carries a cell list; and when the applicable range of the UE capability configuration information is the base station, the broadcast signaling further carries a base station list.

* * * * *